United States Patent [19]

Sakhpara

[11] Patent Number: 4,942,214

[45] Date of Patent: Jul. 17, 1990

[54] FLEXIBLE BREATHABLE POLYURETHANE COATINGS AND FILMS, AND THE PREPOLYMERS FROM WHICH THEY ARE MADE

[75] Inventor: Dilip J. Sakhpara, Newark, Del.

[73] Assignee: W. L. Gore & Assoc. Inc., Newark, Del.

[21] Appl. No.: 213,059

[22] Filed: Jun. 29, 1988

[51] Int. Cl.$^5$ .............................................. C08G 18/10
[52] U.S. Cl. ..................................... 528/59; 521/914; 528/61; 528/66; 528/76
[58] Field of Search ...................... 528/59, 61, 65, 76; 521/914

[56] References Cited

U.S. PATENT DOCUMENTS 4,127,516 11/1978 Larsen et al. ...................... 521/137

Primary Examiner—Maurice J. Welsh

[57] ABSTRACT

The invention relates to flexible breathable polyurethane coatings and films and to the prepolymers from which they are formed. These prepolymers are isocyanate-capped poly (alkylene oxide) glycol polyurethanes with low viscosities and low freezing points. The difunctional nature of the random copolymers of ethylene oxide and prepylene oxide added to simple diols provide the low viscosity and low freezing points; high levels of ethylene oxide in the polyol provides the breathability.

7 Claims, No Drawings

FLEXIBLE BREATHABLE POLYURETHANE COATINGS AND FILMS, AND THE PREPOLYMERS FROM WHICH THEY ARE MADE

FIELD OF THE INVENTION

The present invention relates to flexible breathable polyurethane coatings and films and to the prepolymers from which they are formed. These prepolymers are isocyanate-capped poly(alkyleneoxide) glycol polyurethanes with low viscosities and low freezing points.

BACKGROUND OF THE INVENTION

Hydrophilic polyurethane resin coatings function by absorbing moisture on the side exposed to high humidity and discharging moisture from the side exposed to low humidity; that is they are moisture vapor permeable. This property is known as breathability. Breathability is a very desirable comfort factor for clothing.

Breathability is achieved in urethane polymers by incorporating in them polyols which contain major portions of alkylene oxide units, usually ethylene oxide units. With urethane coatings containing about 55% of oxyethylene units by weight, the minimum desired vapor transmission rate can be achieved. Other chemical factors also appear to affect the moisture vapor transmission rate. For instance, increased cross linking in the polymer appears to lower the moisture vapor transmission rate.

The breathability of the urethane polymer can be transferred to porous hydrophobic substrates, such as expanded porous polytetrafluoroethylene as described in U.S. Pat. Nos. 3,953,566, 4,194,041, 4,187,390, 4,110,392, 4,482,516, and 4,025,679 by either applying a hydrophilic coating to the surface of the substrate or by casting a film of the hydrophilic resin on a release paper and then adhering the film to the surface of the substrate. It is to the formation of such coatings and films that this invention is directed. Not only do the coatings and films need to be highly breathable, as measured by the moisture vapor transmission rates, but their precursors, the prepolymers from which they are formed need to have selected properties as well. Among the several highly desirable properties in the prepolymers are:

1. They should have very low melting points, preferably below 0° C. Crystallization or precipitation in the coating mixture leads to flaws and pinholes during coating operations. Such coatings must be scrapped. Operation at increased temperatures to ensure all of the material is molten leads to increased levels of toxic isocyanate monomers in the air.

2. The liquid prepolymers should have low viscosities, preferably 15,000 cps or lower at 25° C. This reduces or eliminates need for solvents, which are usually used to thin the coating mixture to usable viscosities. The environmental factors which are affected by organic solvents in the atmosphere are well known and pressures are constantly being applied to reduce their emissions.

3. They should produce final coatings or films with good breathability, i.e., with moisture vapor transmission rates of at least 5000 g/m$^2$/day on 5 to 10 mil thick films. This can be achieved only with high levels of oxyethylene groups in the final polymer.

4. They should contain less volatile, and therefore less hazardous, diisocyanates and/or very low levels of free isocyanate in the prepolymer. The most common diisocyanate used in coatings is toluene diisocyanate (TDI) which is 200 times more volatile than diphenyl methane diisocyanate (MDI), so the drive to use MDI and other less volatile diisocyanates is very strong. Similar safety benefits can be achieved, however, by reducing the more volatile diisocyanates to very low levels in the prepolymers.

Prepolymers made with MDI tend to be solids, as the MDI molecule is symmetrical, whereas TDI prepolymers tend to be liquids or low melting solids due both to the asymmetry in the TDI molecule and to the fact that commercial TDI is a mixture of its 2,4- and 2,6- isomers.

Keeping the functionality, that is, the number of active groups per molecule of the reaction components down to about 2 (and not above 2.2) is another means to produce prepolymers with low viscosities.

Other workers (European Pat. Appln. No. 0 218 881) used trifunctional polyols with diisocyanates and included lower molecular weight diols to make hydrophilic, breathable coatings. As is demonstrated in our comparative examples, use of this method with TDI resulted in low water vapor permeability and with MDI the water vapor permeability was low and the viscosity was outside a useable range at 58,500 cps.

The present invention aids in overcoming the above mentioned restrictions and produces low melting, low viscosity prepolymers containing less volatile hazardous isocyanate and which cure to highly hydrophilic coatings and films.

SUMMARY OF THE INVENTION

This invention utilizes difunctional copolymers of ethylene oxide and propylene oxide or butylene oxide to provide sufficient asymmetry in the poly(oxyalkylene) glycol portion of the polyurethane prepolymer to overcome the symmetrical effects in the diisocyanate, especially in diphenyl methane diisocyanate which usually results in very viscous prepolymers which are solid at room temperature.

Thus, the prepolymers of this invention comprise the reaction products of:

(a) a difunctional poly(oxyalkylene) glycol with a molecular weight between 1000 and 4000 said difunctional poly(oxyalkylene) glycol being a random copolymer of ethylene oxide and propylene oxide added to ethylene glycol, propylene glycol or 1,4-butanediol; the ethylene oxide content of the difunctional poly(oxyalkylene) glycol being between 60% and 95% by weight and;

(b) a polyisocyante with a functionality between 2.0 and 2.2.

The prepolymers are designed to have low vapor pressures of unreacted monomeric hazardous diisocyanates. The low viscosity, low freezing point allows for the reduction or elimination of solvent when using the prepolymer to form flexible coatings and films.

As a general rule in organic chemistry, as the symmetry of a molecule increases, so too does its tendency to crystallize and to melt at a higher temperature. Surprisingly, the effect of the randomness in the difunctional poly(oxyalkylene)oxide also extends to other isocyanates, even to toluene diisocyanate which is in itself nonsymmetrical, and this allows the use of lower than normal ratios of NCO/OH in the prepolymer, still staying within the desired viscosity parameters, but providing prepolymers with greatly reduced levels of toxic free monomeric diisocyanate.

Prepolymers described in this invention provide, upon curing, polymeric nonporous coatings and films which have excellent moisture vapor transmission rates, that is, they are breathable to water vapor, an essential property for comfort in rainwear, shoes etc. which are intended to repel water. The breathability is achieved by using poly(oxyalkylene) glycols that contain 60-95% ethylene oxide.

THE PREFERRED EMBODIMENT

To make polyurethanes, diisocyanates are reacted with polyols. To make breathable polyurethanes, diisocyanates are reacted with poly(oxyethylene) glycols (PEG), usually with molecular weights of 1000 or greater. However, the reaction product of MDI and PEG 1000 is a solid at room temperature.

To introduce assymetry into a polyurethane prepolymer intended to form flexible, breathable films and coatings, the poly(oxyalkylene) glycols were made to be asymmetric and difunctional. This was done by forming random addition copolymers of ethylene oxide with propylene oxide or butylene oxide added to simple difunctional $C_2$ to $C_4$ glycol initiator such as ethylene glycol, propylene glycol or 1, 4 - butanediol. Ethylene oxide contents of 60-95% by weight, the remainder being propylene oxide or butylene oxide with molecular weights of 1000 to 4000 are necessary to achieve the desired levels of breathability, measured herein as moisture vapor transmission rates (MVTR). The minimum acceptable breathability as measured herein is represented by films with MVTR values of 5000 $g/m^2/24$ hrs with 5 to 10 mil films.

More preferred range of the ethylene oxide content in the poly(oxyalkylene) glycol is between 70% and 90%, the remainder is propylene oxide and the preferred molecular weight is between 1500 and 3000.

Formation of polymers, such as polyurethanes from polyisocyanates and polyols requires at a minimum that the isocyanate be difunctional (have two isocyanate groups/molecule) and the polyol be difunctional (have two hydroxyl groups/molecule). Introduction of higher functionalities, i.e. triols, tetraols or higher results in increased viscosities in the prepolymers. To keep prepolymer viscosities as low as possible, the functionality of the poly(oxyalkylene) glycol used in this invention was restricted to 2 and the functionality of the polyisocyanate was restricted to 2 to 2.2.

The isocyanate component in this invention may be aromatic, aliphatic or alicyclic. Polyisocyanates suitable for use herein include m-xylene diisocyanate, p-xylene diisocyanate, toluene diisocyanate, diphenyl methane dissocyanate, dimethoxy diphenyl diisocyanate, naphthalene diisocyanate and isophorone diisocyanate. It is also possible to use derived polyisocyanates, e.g. those containing carbodiimide groups so long as the functionality does not exceed 2.2. The preferred diisocyanates include, toluene diisocyanate, diphenyl methane diisocyanate, dicyclohexyl methane diisocyanate and modified diphenyl methane diisocyanate (MDI) which has a isocyanate functionality of 2.0 to 2.2.

Preparation of the prepolymers consists of stirring the reactive monomers in a dry atmosphere, usually under nitrogen at slightly elevated temperatures until the isocyanate content by analysis is at the theoretrical value for the reaction mixture. Catalysts may be used to reduce the reaction time.

The prepolymers of this invention are low melting, preferably below 0° C., and have viscosities of 15,000 cps or less at 25° C.

Coating or film forming materials having these properties can be used in conventional coating and film forming equipment such as gravure roll, transfer roll or knife over roll machines with reduced amounts of solvent or no solvent at all, as the solvents are usually added to dissolve solids or reduce viscosity. It is desirable to reduce or eliminate the use of solvents in coating processes not only because of their added cost and their often being fire hazards, but also to reduce emissions of volatile organics into the atmosphere.

In addition to having low melting points and viscosities of 15,000 cps or less at 25° C. it is also an objective of this invention to reduce the hazards of working with diisocyanate which are very toxic chemicals. Fortunately, isocyanate capped prepolymer molecules have extremely low volatilities, and so do not result in significant levels of isocyanate in the atmosphere. The unreacted monomeric diisocyanates, on the other hand have appreciable volatilites and can vaporize to concentrations well above the allowable concentrations permitted by OSHA. Since the vapor pressures of the organic diisocyanates increase with increasing temperature, the usual means of reducing the viscosity of the coating mixes, i.e. simply by operating at higher temperatures, is not an attractive alternative since it increases the health hazard in the workplace.

Moreover, the most common of the diisocyanates used in coatings is toluene diisocyanate (TDI), usually as a mixture of its 2,4 - and 2,6 - isomers, and TDI has a very significant vapor pressure. An alternative to TDI is diphenyl methane diisocyanate (MDI) which has a vapor pressure only about 1/200 of that of TDI and use of MDI is one way to reduce the diisocyanate exposure hazard while making films or coatings. An alternative to changing to MDI would simply be to have very low concentrations of free TDI monomer in the prepolymer. Sometimes this can be achieved by thin film vacuum stripping, but this is a very costly process.

In addition to the safety advantage of MDI over TDI, MDI polymers have better physical strength and improved color retention than do comparable TDI polymers.

Within the science of organic chemistry it is well known that symmetry in a molecule tends to increase its melting point and that mixtures have melting points lower than pure compounds. MDI (4,4'-diphenyl methane diisocyanate) is a balanced symmetrical molecule. It is a solid which melts at 38° C.

TDI is an asymmetric molecule, and the commercial TDI is a mixture of isomers, as a result the melting point of the commercial TDI is about 14° C.

Formation of flexible, breathable coatings and films from isocyanate-capped prepolymers as described herein can be accomplished by either allowing the spread coatings or films to react with atmospheric moisture (moisture curing). Alternatively, curing agents such as glycols, amino alcohols, diamines or diamine carbamates may be added to chain extend and cure the prepolymer. Catalysts may be used to increase the rate of reaction with atmospheric moisture or with other curing agents.

It may be also desirable to add polyisocyanates with functionalities greater than two to the coating or film forming mixtures to alter the hardness or toughness of the final coatings or films.

Other additives, such as fillers, pigments, matting agents, fire retardants or light stabilizers may also be added to the final mixture prior to forming a coating or film for the special properties that each can confer to the polymeric coatings and films.

In table II, Comparative Examples, Example 6 is a simulation of Example 2 in European Patent Application No. 0,218,811 to Asahi Glass Company Ltd. The polyol is based upon trifunctional trimethylol propane combined with ethylene oxide and propylene oxide in a weight ratio of 80/20 to a molecular weight of 3500. The second polyol is polyethylene glycol of molecular weight 400. Toluene diisocyanate is used as the diisocyanate. The resultant prepolymer has a suitably low viscosity, an adequately low melting point but contains 2.55% free monomeric TDI. A moisture cured film of the prepolymer has a moisture vapor transmission rate (MVTR) of only 4600 g/m$^2$/24 hr.

The results of repeating this experiment, but using MDI instead of TDI, are shown in Example 7. The viscosity of the prepolymer is 58,500 cps, well outside of a usable range, except with solvent. The freezing point is adequately low. A moisture cured film has a MVTR of only 2442 g/m$^2$/24 hrs.

Example 8 was performed to demonstrate the effect of the preferred copolymer of the poly(oxyalkylene) glycol on the freezing point. Polyethylene glycol 2000 and polypropylene glycol 2000 were mixed in an 80/20 ratio to provide the same ratio of ethylene oxide to propylene oxide as in the preferred glycol. The MDI prepolymer was a solid at room temperature.

In contrast to the comparative studies, the examples shown in Table I clearly demonstrate the effect of the preferred bifunctional random copolymer of ethylene oxide and propylene oxide added in an 80/20 weight ratio to propylene glycol to a molecular weight of 2010.

Example 1 (using the preferred polyol) may be compared directly with Example 6. In Example 1 the viscosity is about half that of the triol-based prepolymer (Example 6), and the MVTR is almost twice that of the triol-based polymer.

The viscosity was so low in Example 1 that it allowed the preparation of a prepolymer with less than a 2/1 ratio of NCO/OH (Example 3) which resulted in a fully acceptable prepolymer viscosity, freezing point and MVTR as well as an exceedingly low and acceptable level of free TDI monomer in the prepolymer.

The most notable difference between the comparative examples in Table II and those in Table I resulted from the use of MDI as the diisocyanate with the two polyols. Whereas the triol based prepolymer (Example 7) has a viscosity of 58,500 cps, the prepolymer made with the preferred glycol (Example 2) has a viscosity of only 14,250 cps and almost 4 times as high a MVTR as the triol derivative. A higher NCO/OH ratio (Example 4) resulted in a further reduction of the viscosity to 11,500 cps, albeit with an increase in the free MDI monomer in the prepolymers. About 6% free MDI monomer appears to present an acceptably low health risk.

Example 5, using dicyclohexyl methane diisocyanate illustrates that similar effects to these with MDI are achievable with this alicyclic diisocyanate.

MONOMERIC ISOCYANATE DETERMINATION(1)

The analytical procedure used for quantitation of monomeric isocyanate content in the prepolymers was based on work done by Spagnolo, and Malone[1], except that diethylamine was used to convert monomeric isocyanate groups to their urea derivative and the liquid chromatograph was performed with tetrahydrofuran as the mobile phase at a flow rate of 1 ml/minute. The separation was done on a series of PL Gel columns (Polymer Laboratories) with pore sizes of 50, 500, and 10,000 angstrom. Quantitation was done by electronic integration on a Perkin Elmer 7600 data station with Chrom 3 and GPC 6 Software. Monodisperse polystyrene 7835, 5000, 9000, 30100, 19000 were used for molecular weight standards.

(1) Journal of Chromatography 14, p. 52–58 (1976) "Quantitative Determination of Small Amounts of Toluene Diisocyanate Monomer in Urethane Adhesives by Gel Permeation Chromatography", Frank Spagnolo, W. M. Malone.

FREEZING POINT DETERMINATION

Instrument-Rheometrics System 4
Motor-Dynamic
Transducer-2000 g/cm
Mode-Temperature Sweep
Test-Parallel Plate
Temperature-25° C.
Rate-10 rad/sec
Strain-10%
Zero Gap at Room Temperature
Final Trim at 0.74 mm
Test Geometry-
  Gap 0.7 mm
  Parallel Plate Radius 25 mm
Sweep Parameter-
  Last Temperature-30° C.
  Degrees Per Step 3
  Thermal Soak-2 minutes As the temperature decreases, the material goes through a phase transition and the transducer overloads, terminating the test. The temperature at which the transducer overloads is the freezing point.

SAMPLE PREPARATION FOR POLYMER PROPERTIES (INCLUDING MVTR)

To about 50 gm of the prepolymer in a disposable 200 ml plastic beaker, was added 1 or 2 drops of tetramethylbutanediamine (TMBDA) to catalyze the water-prepolymer reaction. A 5 mil draw down on 1 mil thick expanded PTFE membrane was performed using a 5 mil draw down bar. The film was placed in a humidity chamber with relative humidity of 70–90%, and allowed to cure at room temperature for 2 days.

MOISTURE VAPOR TRANSMISSION (RATE) TEST

A description of the test employed to measure moisture vapor transmission rate (MVTR) is given below. The procedure has been found to be suitable for testing films, coatings and coated products.

In the procedure, approximately 70 ml of a saturated solution of potassium acetate and distilled water was placed into a 133 ml polypropylene cup, having an inside diameter of 6.5 cm at the mouth. An expanded PTFE membrane, having a Gurley number of about 7 seconds, a bubble point of about 179 kPa, thickness of about 37 microns and a weight of about 20 g/m$^2$, available from W. L. Gore & Associates of Newark Delaware, was heat sealed to the lip of the cup to create a taut, leakproof, microporous barrier containing the salt solution.

A similar expanded PTFE membrane was mounted taut within a 12.5 cm embroidery hoop and floated upon the surface of a water bath. The water bath assembly was controlled at 23° C. plus or minus 0.1° C., utilizing a temperature controlled room and a water circulating bath.

The sample for testing was mounted on a 7.5 cm diameter hoop so that the coating would face-up when placed on the 12.5 cm embroidery hoop. The 7.5 cm hoop with test sample was placed on the 12.5 cm hoop for 30 minutes to equilibrate.

The cup assembly was weighed to the nearest 1/1000 gm and was placed in an inverted manner onto the center of the test sample.

Water transport was provided by the driving force between the water and the saturated salt solution providing water flux by diffusion in that direction. The sample was tested for 15 minutes and the cup assembly was then removed, weighed again to within 1/1000 g.

The MVTR of the sample was calculated from the weight gain of the cup assembly and was expressed in grams of water per square meter of sample surface area per 24 hours.

EXAMPLE 1

Toluene diisocyanate, 80/20, (Mondur TD-80) 48 g. was stirred under dry nitrogen for 4 hours with 252 g. of poly(oxyethylene oxypropylene) glycol random copolymer, molecular weight 2010. while heating at 90° C. The isocyanate-capped prepolymer contained 4.4% isocyanate by weight vs. a theoretical content of 4.2%[1]. Properties of the prepolymer and a cured film of the prepolymer are shown in Table I.

[1] NCO determinations were performed using ASTM method D 2572-80.

EXAMPLE 2

Diphenyl methane diisocyanate (64.5 g.) was stirred under dry nitrogen for 4 hours with 235 g. poly(oxyethylene oxypropylene) glycol random copolymer, molecular weight 2010 while heating at 90° C. The isocyanate-capped prepolymer contained 3.9% isocyanate by weight vs=a theoretical content of 4.0%. Properties of the prepolymer and a cured film are shown in Table I.

TABLE I
EXAMPLES

| Example | Polyol | Isocyanate | NCO/OH Ratio | % NCO Content Theor. | % NCO Content Actual | Viscosity[5] at 25° C. CPS | % Ethylene Oxide in the prepolymer | Freeezing Point °C. | Free Monomer Content TDI % | MDI % | MVTR g/m$^2$/24 hr |
|---|---|---|---|---|---|---|---|---|---|---|---|
| 1 | PEPG2000[1] | TDI[2] | 2.2 | 4.2 | 4.4 | 3,063 | 67.2 | −39 | 2.13 | | 8454 |
| 2 | PEPG2000 | MDI[3] | 2.2 | 4.0 | 3.9 | 14,250 | 62.8 | −30 | | 5.09 | 7395 |
| 3 | PEPG2000 | TDI | 1.8 | 2.9 | 2.9 | 5,000 | 69.2 | −32 | 0.38 | | 8792 |
| 4 | PEPG2000 | MDI | 2.4 | 4.5 | 4.5 | 11,500 | 61.6 | −30 | | 6.3 | 7241 |
| 5 | PEPG2000 | HMDI[4] | 2.2 | 3.9 | 3.8 | 12,500 | 62.1 | −31 | | 5.0[4] | 6413 |

[1] PEPG2000 is a difunctional glycol made by adding 80% ethylene oxide and 20% propylene oxide to propylene glycol to a molecular weight of 2010.
[2] TDI is 80/20 toluene diisocyanate.
[3] MDI is diphenyl methane diisocyanate. (Mondur-M, from Mobay Corporation)
[4] HMDI is hydrogenated MDI or dicyclohexylmethane diisocyanate.
[5] Viscosities were determined at 25° C. using a Brookfield Viscometer, Spindle No. 27 according to ASTM D 3236-73.

TABLE II
COMPARATIVE EXAMPLES

| Example | Polyols | Isocyanate | NCO OH Ratio | % NCO Content Theor. | % NCO Content Actual | Viscosity at 25° C. CPS | % Ethylene Oxide in the Prepolymer | Freezing Point °C. | Free Monomer Content TDI % | MDI % | MVRT g/m$^2$/24 hr |
|---|---|---|---|---|---|---|---|---|---|---|---|
| 6 | TPEP Glycol[1] PEG 400[2] | TDI | 2.2 | 5.8 | 5.4 | 6,750 | 64.8 | −30 | 2.55 | | 4600 |
| 7 | TPEP Glycol[1] PEG 400[2] | MDI | 2.2 | 5.3 | 5.2 | 58,500 | 59.1 | −19 | | 5.88 | 2442 |
| 8 | PEG 2000[3] PPG 2000[4] | MDI | 2.2 | | | Solid at Room Temp. | 62.8 | Solid at Room Temp. | | | |

[1] TPEP, a triol based upon trimethylol propane with ethylene oxide and propylene oxide in a weight ratio of 80/20 to a molecular weight of 3500.
[2] PEG = polyethylene glycol, molecular weight 400.
[3] PEG = polyethylene glycol, molecular weight 2000.
[4] PPG = polypropylene glycol, molecular weight 2000.

POLY(OXYALKYLENE)GLYCOLS

The glycols used in the preparation of liquid hydrophilic isocyanate-capped prepolymers in this invention are the random copolymer addition products of ethylene oxide and propylene oxide or butylene oxide to simple difunctional $C_2$ to $C_4$ glycols including ethylene glycol, propylene glycol and 1,4 - butanediol. The oxyethylene content of the copolymers may vary from 60% to 95%, more preferably from 70% to 90%, the remainder being either $C_3$ or $C_4$ oxides. The molecular weight of the final copolymer is 1000 to 4000, preferably 1500 to 3000.

EXAMPLES 3 and 4

Examples 3 and 4 were performed in a like manner to Examples 1 and 2.

EXAMPLE 5

Dicyclohexylmethane diisocyanate (111.9 g.) was stirred under nitrogen with 388 g. of poly(oxyethylene oxypropylene) glycol random copolymer, molecular weight 2010 with 3 drops of dibutyltin dilaurate (catalyst) at 60° C. until the NCO value was 3.8% vs. a theoretical value of 3.9%.

COMPARATIVE EXAMPLES

Example 6 is a repetition of Example 2 in European Patent Application No. 0 218 881 to Asahi Glass Company Limited. The polyalkylene oxide polyol was trifunctional, based on trimethylol propane to which ethylene oxide and propylene oxide were added in a ratio of 80 parts ethylene oxide to 20 parts propylene oxide to a molecular weight of 3500. The viscosity of the TDI based polyurethane prepolymer was 6750 cps vs. 7000 cps in the application and the MVTR was 4600 g/m$^2$/24 hours. This illustrates the viscosity and MVTR to be expected from a triol/diol mixture using asymmetric TDI.

Example 7 was based on Example 6, but used MDI instead of TDI with a triol/diol system. The viscosity of the product was 58,500 cps and the MVTR lower than the TDI analog in Example 1.

In Example 8, polyethylene glycol 2000 and polypropylene glycol 2000 were mixed to get an ethylene oxide/propylene oxide ratio of 80/20 to compare these results with a random copolymer of the same constitution as used in Example 1 to 5. The reaction product was solid at room temperature.

What is claimed is:

1. Low viscosity, low freezing point isocyanate-capped prepolymers for making breathable coatings and films comprising the reaction product of:
   (a) a difunctional poly(oxyalkylene) glycol with a molecular weight between 1000 and 4000, said difunctional poly(oxyalkylene) glycol being a random copolymer of ethylene oxide and propylene oxide added to ethylene glycol, propylene glycol or 1, 4-butanediol; the oxyethylene content of the difunctional poly(oxyalkylene) glycol being between 60% and 95% by weight, and
   (b) a polyisocyanate with a functionality between 2.0 and 2.2, said polyisocyanate being selected from the class consisting of diphenyl methane diisocyanate and dicyclohexyl methane diisocyanate.

2. A prepolymer as described in claim 1 wherein the ethylene oxide content of the difunctional poly(oxyalkylene) glycol is between 70% and 90%, the remainder being propylene oxide and the molecular weight is between 1500 and 3000.

3. A prepolymer as described in claim 1 in which the reactants are used in a ratio of molar equivalents of NCO to OH of 1.5 to 4.0.

4. A prepolymer as described in claim 1 in which the reactants are used in a molar equivalent ratio of NCO/OH of 2.0 to 3.0.

5. A prepolymer as described in claim 3 or 4 having a viscosity of 15,000 cps. or less and a freezing point of below 0° C.

6. Breathable coatings or films formed from the low melting, low viscosity isocyanate-capped prepolymers described in claim 5 which are cured with or without catalysts by:
   (a) addition of alkanolamines, polyamines or diamine carbamate curing agents, or
   (b) by atmospheric borne moisture.

7. Breathable coatings and films as described in claim 6 which have moisture vapor transmission rates of at least 5000 g/m$^2$/24 hours when such coatings or films are 5 to 10 mil. thick and the MVTR is measured as described herein.

* * * * *